March 1, 1938.　　　　K. KASHIWAGI　　　　2,109,825
CLINICAL THERMOMETER
Filed Feb. 12, 1937

Inventor:
K. Kashiwagi
By E. F. Wenderoth
Atty

Patented Mar. 1, 1938

2,109,825

UNITED STATES PATENT OFFICE 2,109,825

CLINICAL THERMOMETER

Kyosuke Kashiwagi, Tokyo, Japan

Application February 12, 1937, Serial No. 125,483

1 Claim. (Cl. 73—374)

This invention relates to improvements in a clinical thermometer wherein a glass bar with a capillary for mercury is provided in an outer glass tube, the section of the glass bar being so formed as to give a magnified vision of the mercury line.

A clinical thermometer of this type has a scale plate enclosed in an outer glass tube, and the longitudinal movement of the plate in the tube is generally prevented by keeping the plate against the bottom of the tube. This means, however, cannot prevent the scale plate from turning on its axial line or shifting sidewards.

It is well known that a magnified vision of a mercury line in a capillary can be seen from one direction only, and it is important that surface of the scale plate is to be kept in the outer tube perpendicular to the direction of the magnified visual line of mercury.

According to this invention, the outer tube consists of front and back arc-shaped glass walls which are connected at each side thereof making two angular corners along whole length of the outer tube. The angular corners in the tube serve to receive the sides of a scale plate to be inserted in the tube so as to determine the proper position of the scale plate.

The main object of this invention is to obtain a clinical thermometer wherein the scale plate does not turn along its axial line or shift sidewards after it has been placed in the outer tube, keeping the surface of the scale plate perpendicular to the magnified visual line of mercury.

Another object of the invention is to obtain a thermometer wherein a clear and distinct vision of mercury line can be seen through a transparent front wall.

Figure 1:
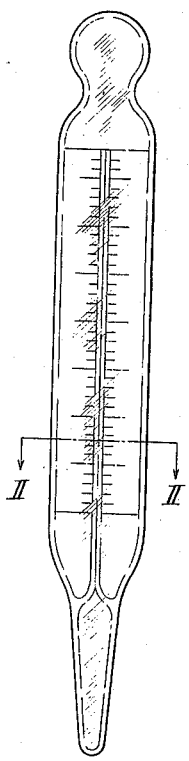

In the accompanying drawing, Figure 1 shows an elevation of a clinical thermometer according to this invention.

Figure 2:
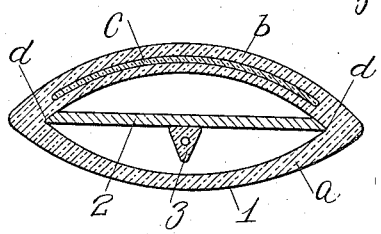

Figure 2 is a sectional view on line II—II of Figure 1, the size being enlarged for the sake of distinctness.

In the drawing, an outer tube 1 consists of a front wall $a$ and a back wall $b$, both being connected together at their longitudinal edges forming an angular corner $d$ at each side in the tube. Each wall has an arc-shaped section, and the front one is made of transparent glass while the back one is the same glass having a layer $c$ of opaque glass embedded therein.

A scale plate 2 is inserted in the outer tube, each side thereof being kept in the angular corner $d$ in the tube.

The glass bar 3 for capillary is fixed to the outer tube at its lower end, and its section is so shaped that the mercury column in the capillary is magnified in view when it is looked at in a direction perpendicular to the surface of the scale plate 2. In other words, the angular corners $d$ are so positioned that in case a scale plate is inserted in the outer tube so as to have its sides held in the corners, the plate takes its proper position relative to the glass bar 3. Since the scale plate is held by the angular corners, it cannot turn on its longitudinal axis or shift sidewards after it has been inserted in the tube. The upper end of the tube is closed as usual keeping the plate at its head against the bottom of the tube so as to prevent its longitudinal movement.

The front glass wall of the outer tube of this invention being in the shape of an arc, it affords a clear and distinct vision of mercury line, thoroughly doing away with the trouble of finding difficulty in reading the scale due to reflection of light, which is common with an ordinary clinical thermometer having its outer tube in an angular form in section.

As the back wall of the outer tube has a layer of opaque glass therein, the reading of indications on the scale plate can be made easy in contrast with the opaque back even where a transparent glass is used for the scale plate.

What I claim is:—

A clinical thermometer comprising a glass bar having a capillary tube for the mercury which appears in a magnified visual line, an outer tube comprising front and back glass arc-shaped walls, the connecting lines of the walls being so formed that two angular corners are provided along the length of the tube, and a scale plate in the outer tube with its sides held fixed by said angular corners whereby the surface of the scale plate is determined to be perpendicular of the magnified visual line of mercury.

KYOSUKE KASHIWAGI.